United States Patent
Messina et al.

[15] 3,639,241
[45] Feb. 1, 1972

[54] GREASE COMPOSITIONS

[72] Inventors: Joseph F. Messina, Havertown; Henry Gisser, Philadelphia, both of Pa.

[73] Assignee: The United States of America as represented by the Secretary of the Army

[22] Filed: Sept. 26, 1969

[21] Appl. No.: 861,486

[52] U.S. Cl. .................................................. 252/54.6
[51] Int. Cl. ................................... C10m 7/28, C10m 7/24
[58] Field of Search ................................. 252/58, 54.6

[56] References Cited

UNITED STATES PATENTS

| | | | |
|---|---|---|---|
| 3,258,425 | 6/1966 | Burke | 252/58 |
| 3,262,879 | 7/1966 | Messina | 252/58 |
| 3,453,210 | 7/1969 | Wright | 252/58 |

*Primary Examiner*—Daniel E. Wyman
*Assistant Examiner*—I. Vaughn
*Attorney*—Harry M. Saragovitz, Edward J. Kelly, Herbert Berl and S. Dubroff

[57] ABSTRACT

Stable grease compositions for use with equipment at extremely low temperatures, the greases consisting of about 64.1 to 69.4 weight percent bis(2-ethylhexyl) sebacate, the balance being tetrafluoroethylene polymer having a molecular weight of 10,000-50,000, a softening point of 321.1° C., a particle size less than 30 microns in diameter, and supplied as a 7.5 percent suspension in trichlorotrifluoroethane.

2 Claims, No Drawings

GREASE COMPOSITIONS

The invention described herein may be manufactured, used, and licensed by or for the Government for governmental purpose without the payment to us of any royalty thereon.

This invention relates to improved lubricants and more particularly concerns grease compositions which are chemically and physically stable over wide temperature ranges for extended periods.

Current grease-type lubricants are generally inoperable over a wide temperature range, especially at extremely low temperatures, and are thus not completely suitable for many potential military applications. For example, where lubricants do not possess physical characteristics which will permit their successful and reliable operation on equipment at extremely low temperatures, serious operational problems are introduced which often necessitates the use of auxiliary heaters to raise ambient temperatures. Similarly, extreme pressure properties in grease compositions are usually obtained through the addition of extreme pressure additives which may undesirably affect stability and viscosity properties, among others.

It is therefore an object of the invention to provide improved grease compositions which are free of the above-mentioned disadvantages.

Another object of the invention is to provide grease compositions which exhibit excellent low torque characteristics at extremely low temperatures, good shear and oxidation stability, a low fluid separation and high dropping point, and good extreme pressure properties.

Other objects and features of the invention could become apparent as the invention is more fully hereinafter disclosed.

Briefly, we have discovered new grease compositions especially useful to the military wherein an ester of a carboxylic acid, i.e., bis(2-ethylhexyl) sebacate is thickened with a perfluoro polymer.

More specifically, we have discovered that bis(2-ethylhexyl) sebacate may be thickened with tetrafluoroethylene polymer (hereinafter referred to as PTFE) having a molecular weight of about 10,000–50,000 to produce a stable, grease-type lubricant for military applications, among others.

Typical properties of the PTFE solids used in the preparation of our inventive compositions are:
 a softening point of 321.1° C.,
 a particle size under 30 microns in diameter, the PTFE solids being supplied as a 7.5 percent suspension in trichlorotrifluoroethane. The viscosity of the base fluid, determined at 37.78° C. is 12.7 centistokes.

The greases were prepared as follows:

The dispersion of PTFE in trichlorotrifluoroethane was heated on a steam bath until 50–75 percent of the solvent evaporated. Approximately 75 percent of the required quantity of bis(2-ethylhexyl) sebacate was then added, the mixture was stirred and heating continued until all the trichlorotrifluoroethane had evaporated. The trichlorotrifluoroethane was analyzed by gas chromatography using the following technique. A sample of the grease mixture was eluted using C.P. benzene. The eluted fluid mixture was placed in a gas chromatograph with a 20 feet carbowax 20 M column at 50° C. and a helium gas flow of 10 ml. per minute. Absence of a retention peak after 3.3 minutes indicated that all of the trichlorotrifluoroethane had evaporated. The remainder of the bis(2-ethylhexyl) sebacate was then added while stirring, and stirring continued until a homogeneous greaselike product was obtained. The mixture was cooled to room temperature and passed through a colloid mill with the stator-to-rotor clearance set at 0.001 in. The homogenized mixture was then placed in a freezer at minus 10° C. for 24 hours, removed and permitted to remain at room temperature an additional 24 hours prior to use. At least 2 batches of each grease were prepared. The thickener content was determined in duplicate on each batch using a Soxhlet extractor and benzene. The data are presented in table I below:

TABLE I

Grease Composition

| Base Fluid Name | wt. % | PTFE thickener. Four point | wt. % |
|---|---|---|---|
| Bis(2-ethylhexyl) sebacate | 69.4 | <−53.9° C. | 30.6 |

The PTFE thickener content above represents a minimum concentration necessary to provide a stable greaselike structure. If less than the amount above is used, a semifluid consistency usually results. The effective range of base fluid is about 64.1 to 69.4 weight percent.

Shear stability tests were conducted using the one-quarter scale (ASTM D 1403–62) grease worker modified to permit automatic operation. In table II below, the values representing double strokes, the maximum change in consistency is 71 units (1 unit=one-tenth of a millimeter). After 6 month's storage, the change in worked consistency on the stored samples was not significantly different than the change on the unstored samples. The table indicates that the sebacate—PTFE thickened greases were shear stable, and that this property would not change significantly with passage of time. All values presented in tables II thru VI were obtained on grease compositions having the specific proportions as stated in table I above.

TABLE II

Shear Stability

| Grease | 0* | Strokes 500 | 10,000 | 100,000 |
|---|---|---|---|---|
| Bis(2-ethylhexyl) sebacate | 323(306)** | 333(311) | 340(327) | 394(354) |

*Unworked, no strokes.

**Data in parenthesis are values obtained after 6 months storage.

In comparison therewith, prototype grease composition used currently by all military services of the United States Government, other than for chassis lubrication, is a diester mixture base grease including additives and lithium hydroxystearate, MIL-G-23827A, Aug. 1, 1965, and yielded 270 units at 0 strokes and 375 units at 100,000 strokes, a difference of 105, or considerably poorer than our grease composition.

Fluid separation was low. Bleeding values in table III below were corroborated by visual observations on test samples stored in the laboratory from 6 to 12 months.

TABLE III

Fluid Separation And Dropping Point

| Grease | Bleeding, wt. %* | Dropping Point, °C.** |
|---|---|---|
| Bis(2-ethylhexyl) sebacate | 4.2 | 254.5 |

*Fed. Std. Test Method 321.2 (Fed. Std. Test Method 791b, 1966), 100° C. for 30 hours.

**ASTM D 2265-67.

Our greases exhibited a high dropping point (temperature at which the first drop of material falls from the cup), a property useful for high-temperature applications.

In comparison therewith, prototype grease composition used currently by all military services of the United States Government, other than for chassis lubrication, is a diester mixture base grease including additives and lithium hydroxystearate, MIL-G-23827A, Aug. 1, 1965, yielded 5.0 weight percent bleeding and a dropping point of about 163° C., considerably inferior to our grease composition.

The Four-Ball EP Tester determines loads at incipient seizure and at weld. Incipient seizure is defined as the load at which a sudden sizeable increase in wear scar diameter occurs, and weld is the load at which motion of the upper rotating ball in relation to the other three is no longer possible. The data in table IV below show comparable extreme pressure properties when compared with MIL-G-23827A grease, hereinabove referred to:

TABLE IV

Extreme Pressure Properties

| Grease | Seizure load, kg. | Weld load, kg. |
| --- | --- | --- |
| Bis(2-ethylhexyl) sebacate | 90 | 200 |
| 23827A | 90 | 190 |

It must be remembered that no extreme pressure additive is used in the sebacate grease above, whereas MIL-G-23827A grease requires the presence of such an additive.

Similarly, MIL-G-23827A grease requires the presence of an oxidation inhibitor. The data in table V below show the superior oxidation stability of our grease which has no such inhibitor added thereto.

TABLE V

Oxidation Stability*

| Grease | Pressure Drop (lb./sq. in.) |
| --- | --- |
| Bis(2-ethylhexyl) sebacate | 3.5 |
| 23827A | 10.0 |

*ASTM-D-942-50 (100 hours at 121.2° C.).

Torque data in table VI below were obtained using ASTM D 1478-63 slightly modified through the use of a 5-lb. weight on the outer race of the 204 ball bearing to eliminate skidding of the balls. The data clearly demonstrate that our grease composition exhibits a very low torque at −53.9° C. or −65° F. This characteristic is vital to our military, since any reduction or elimination of auxiliary equipment required for starting operations is highly desirable.

TABLE VI

Torque (g.-cm.) at −53.9° C.

| Grease | Starting | Running |
| --- | --- | --- |
| Bis(2-ethylhexyl) sebacate | 404 | 191 |
| MIL-G-A | 3825 | 850 |

We wish it to be understood that we do not desire to be limited to the exact details described, for obvious modifications will occur to a person skilled in the art.

We claim:

1. A homogeneous grease composition comprising about 64.1 to 69.4 weight percent bis(2-ethylhexyl) sebacate, the balance being substantially tetrafluoroethylene polymer having a molecular weight between about 10,000 to 50,000, and a particle size less than about 30 microns in diameter.

2. A homogeneous grease composition exhibiting low torque characteristics at −65° F., shear and oxidation stability, low bleeding and a high dropping point, and improved extreme pressure properties consisting essentially of about 69.4 weight percent bis(2-ethylhexyl) sebacate having a pour point below −65° F., and tetrafluoroethylene polymer having a molecular weight ranging between about 10,000 to 50,000, and a particle size of less than 30 microns in diameter.

* * * * *